US012807302B2

(12) United States Patent
De Carvalho et al.

(10) Patent No.: US 12,807,302 B2
(45) Date of Patent: Nov. 24, 2026

(54) AIRCRAFT LONGITUDINAL CONTROL SURFACE, LONGITUDINAL CONTROL AUGMENTATION SYSTEM FOR AIRCRAFT, AND AIRCRAFT

(71) Applicant: EMBRAER S.A., São José dos Campos (BR)

(72) Inventors: Bruno Javiel De Carvalho, São José dos Campos (BR); João Marcelo Souza Pereira, São José dos Campos (BR); Leonardo Costa Scalabrin, São José dos Campos (BR); Thiago Felske Da Silva, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 0 days.

(21) Appl. No.: 18/472,718

(22) Filed: Sep. 22, 2023

(65) Prior Publication Data

US 2024/0010327 A1 Jan. 11, 2024

Related U.S. Application Data

(63) Continuation-in-part of application No. PCT/BR2021/050124, filed on Mar. 24, 2021.

(51) Int. Cl.
*B64C 9/00* (2006.01)
*B64C 1/26* (2006.01)
(Continued)

(52) U.S. Cl.
CPC .................. *B64C 9/00* (2013.01); *B64C 1/26* (2013.01); *B64C 5/02* (2013.01); *B64C 9/02* (2013.01); *B64C 13/16* (2013.01); *B64D 27/404* (2024.01)

(58) Field of Classification Search
CPC .... B64C 5/02; B64C 9/00; B64C 9/02; B64C 9/16; B64C 9/30; B64C 13/16
See application file for complete search history.

(56) References Cited

U.S. PATENT DOCUMENTS 4,966,338 A 10/1990 Gordon
2016/0144966 A1 5/2016 Trahmer et al.
(Continued)

FOREIGN PATENT DOCUMENTS

FR 2949754 3/2011
WO WO1998/21092 5/1998
(Continued)

OTHER PUBLICATIONS

Wikipedia, Autopilot, accessed on Nov. 11, 2020 via [web.archive.org/web/20201111455078/https://en.wikipedia.org/wiki/Autopilot] (Year: 2020).*
(Continued)

*Primary Examiner* — Justin Michael Heston
(74) *Attorney, Agent, or Firm* — Nixon & Vanderhye P.C.

(57) ABSTRACT

A longitudinal control augmentation surface of aircraft, particularly turboprop/propfan aircraft with engines mounted on the rear portion of the fuselage. This longitudinal control augmentation surface is positioned in the connecting structure of the engine with the fuselage. A longitudinal control augmentation system for aircraft with engines arranged in a rear portion of the fuselage close to a vertical tail, this system comprising means of controlling the longitudinal control augmentation surfaces of the aircraft to distribute a longitudinal offset of the aircraft between these surfaces by means of functions, and an aircraft comprising the longitudinal control augmentation surface and the longitudinal control augmentation system.

19 Claims, 2 Drawing Sheets

(51) Int. Cl.

| | |
|---|---|
| ***B64C 5/02*** | (2006.01) |
| ***B64C 9/02*** | (2006.01) |
| ***B64C 13/16*** | (2006.01) |
| ***B64D 27/40*** | (2024.01) |

(56) References Cited

U.S. PATENT DOCUMENTS

| | | | | |
|---|---|---|---|---|
| 2016/0244150 | A1* | 8/2016 | Hirano | B64C 11/46 |
| 2017/0233060 | A1* | 8/2017 | Glover | B64C 5/02 244/54 |
| 2020/0361592 | A1* | 11/2020 | Englund | B64C 9/12 |
| 2021/0206476 | A1* | 7/2021 | Shin | G05D 1/0816 |

FOREIGN PATENT DOCUMENTS

| | | | | |
|---|---|---|---|---|
| WO | WO-9821092 A1 * | 5/1998 | | B64D 29/04 |
| WO | WO2017114732 | 7/2017 | | |

OTHER PUBLICATIONS

Wikipedia, Flight control surfaces, accessed on Nov. 21, 2020 via [web.archive.org/web/20201121052450/https://en.wikipedia.org/wiki/Flight_control_surfaces] (Year: 2020).*

International Search Report dated Jul. 29, 2021.

* cited by examiner

AIRCRAFT LONGITUDINAL CONTROL SURFACE, LONGITUDINAL CONTROL AUGMENTATION SYSTEM FOR AIRCRAFT, AND AIRCRAFT

CROSS-REFERENCE TO RELATED APPLICATION

This application is a continuation-in-part of PCT Application PCT/BR2021/050124 filed 24 Mar. 2021, which published on 29 Sep. 2022 as WO2022198285, incorporated by reference herein.

FIELD

The technology herein relates to a longitudinal control surface for aircraft, particularly turboprop/propfan aircraft with engines mounted on the rear portion of the fuselage. This longitudinal control surface is positioned on the structure connecting the engine to the fuselage. The technology relates to, also, a longitudinal control system for aircraft with engines arranged in a rear portion of the fuselage and conventional control empennages, which can be used in conjunction with conventional control surfaces to distribute the aircraft's longitudinal control. The technology herein further relates to an aircraft comprising such a system.

BACKGROUND AND SUMMARY

Aircraft with exposed rotary element engines including, but not limited to, turboprops and propfans, are usually used when looking for a low power consumption aircraft for operation on short runways, short routes and/or possible operation on unprepared runways.

However, for better acceptance of these aircraft on regional routes, the engines have been relocated to the rear portion of the aircraft fuselage in order to decrease the exposure of the passenger cabin to the rotating elements of the engines, such as large propellers, and reduce noise in the passenger cabin.

Furthermore, to increase the propulsive efficiency of this type of aircraft, the diameter of propellers is increased resulting in an increase in the dimensions of the pylons, which are the structures responsible integrating the propulsion (engines) with the aircraft's fuselage.

All of these changes in turboprop aircraft configuration have resulted in high configuration stability impairing longitudinal control of the aircraft, i.e., the configuration makes it difficult to take the aircraft off balance to respond to pitch commands during in-flight maneuvers, requiring large deflections of the control surfaces such as the elevator, for example. Moreover, the high stability requires large deflections of the horizontal stabilizer for compensation (trimming) of the aircraft in flight to occur.

To try to solve this problem, it is possible to use a canard, a supporting surface installed on the front part of the fuselage, which helps decreasing the configuration's stability, thus increasing the longitudinal control of this aircraft model. However, for transport aircrafts, the introduction of such a surface on the forward fuselage disrupts the operation of the aircraft on the ground, for example using passenger boarding and disembarking fingers, and basic baggage handling and transport operations.

Whereas the elevator is the control surface actuated for controlling the aircraft pitch (aircraft nose up and down control), there are several known developments for this element with the aim of improving its performance and making it easier to control. WO1998/21092, for example, describes movable flaps arranged in the pylons of jet engines mounted in the rear fuselage. These flaps are used to generate pitching moments to lower the nose of the aircraft, preventing deep stall. In that case, the pylon flap provides additional moments by assisting in the recovery of the aircraft's nose down tilt to decrease the angle of attack in a deep stall condition, a condition that causes the aircraft to lose wing support by being in a very high nose-up condition.

For this reason, the deflection described by WO 1998/21092 occurs only in one direction and is used only for a specific condition (deep stall).

Document WO2017114732 describes an aircraft with rear engines mounted on the horizontal stabilizer. The horizontal stabilizer comprises a fixed internal part attached to the fuselage and containing the elevator, two movable outer parts, each positioned on either side of the horizontal stabilizer and away from the fuselage, so that the fixed inner part and the movable outer parts are at least partially subjected to the airflow coming from the engines when they are in use. The external moving parts act in an integrated way, that is, they are not divided into fixed and mobile parts, and their function is to assist trimming.

Thus, prior art has failed to present an efficient solution for decreasing the stability of aircraft with the propulsion positioned in the rear portion of the fuselage and engine to fuselage connection structures of large proportions, and has presented no alternatives to increase longitudinal control in aircraft with this configuration.

DETAILED DESCRIPTION OF EXAMPLE EMBODIMENTS

Figure 1:
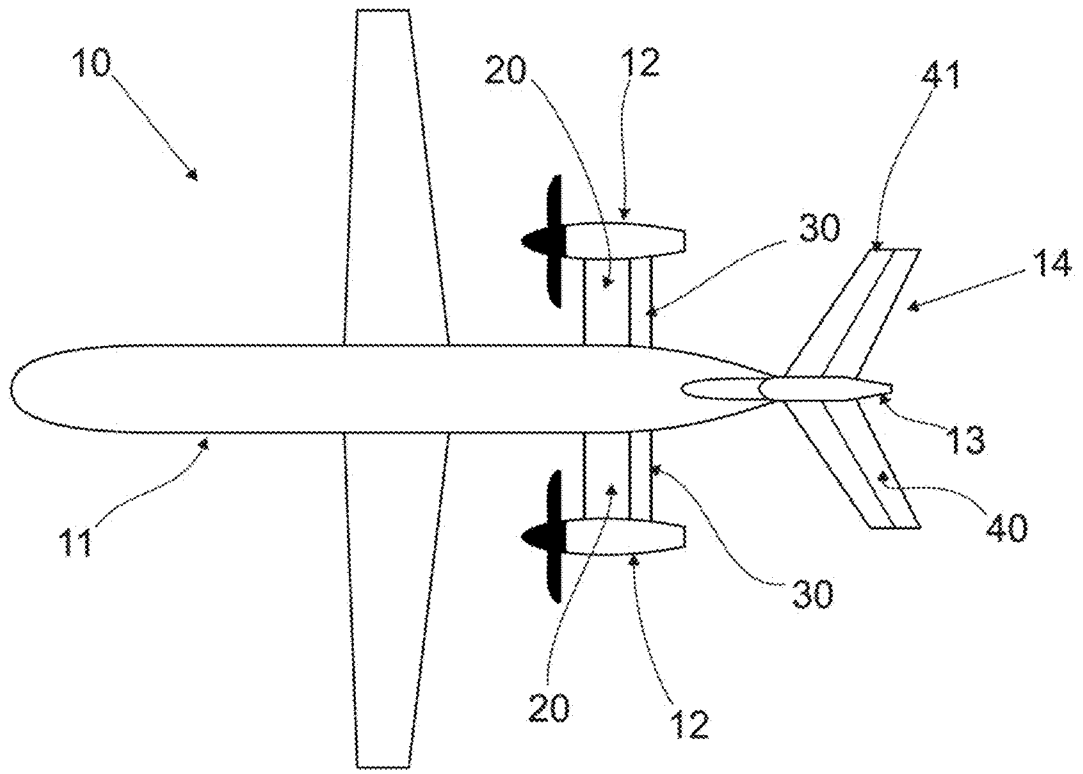
FIG. 1—is a schematic top view of an aircraft with exposed rotary element engines such as but not limited to turboprops and propfans, with the engines positioned in the rear portion of the fuselage and comprising a longitudinal control surface.

The technology herein provides an aircraft with a longitudinal control surface positioned on the structure connecting the engine to the fuselage for increased longitudinal control and to ensure an optimal balance between stability and control in aircraft with exposed rotary element engines including, but not limited to, turboprops and propfans, with engines positioned in the rear portion of the fuselage.

The technology herein also provides a longitudinal control system for aircraft with engines arranged in a rear portion of the fuselage and conventional control empennages, providing specific functions that distribute the longitudinal control and aircraft stability between the longitudinal control surfaces and conventional aircraft control surfaces.

This technology herein also provides a turboprop/propfan type aircraft with engines positioned in the rear portion of the fuselage, and comprising a longitudinal control surface positioned in the structure connecting the engine to the fuselage and the longitudinal control augmentation system.

One example embodiment comprises an aircraft longitudinal control surface with engines arranged in a rear portion of the fuselage, the longitudinal control surface being positioned next to a rear edge of an engine linkage structure in the fuselage at a joint hinged up and down relative to the connecting structure in response to an aircraft longitudinal control command.

An example embodiment provides an longitudinal control augmentation system, particularly for aircraft with engines arranged in a rear portion of the fuselage and provided with primary longitudinal control surfaces and longitudinal stabilizing surfaces, the system comprising:

(i) on-board computer that receives a plurality of signals from a plurality of sensors; and (ii) a plurality of processing functions;

the longitudinal control augmentation system inputs the plurality of sensor signals received by the on-board computer into the plurality of processing functions that issue a plurality of deflection demands to the longitudinal control augmentation surfaces of the aircraft;

the plurality of deflection demands for the longitudinal control enhancement surfaces are received by a summation function which equalizes them and sends a single deflection demand to the longitudinal control enhancement surfaces.

Another embodiment is an aircraft with engines arranged in a rear portion of the fuselage, comprising longitudinal control augmentation surfaces and the longitudinal control system.

The control system of modern aircraft, equipped with digital Fly-By-Wire (FBW) systems, requires control law implemented in their flight computers that receive commands from the pilot and the autopilot and, through rules and pre-stipulated relationships, generate command signals for the various control surfaces of the aircraft. These control laws can be subdivided into "functions" that have specific goals, rules, and demands. These functions, usually pieces of code within the embedded software, can work separately or together to, for example, provide control of a certain axis of an aircraft.

In this sense, the longitudinal control, or pitch control, of an aircraft is the command that controls the elevation of the nose of the aircraft according to the flight stage. This movement is provided by control surfaces known as primary longitudinal control surfaces or elevators, and longitudinal stabilizing surfaces, usually arranged in the aircraft's horizontal empennage. They are movable surfaces that deflect up and down, according to the command entered by the pilot or the flight control computer, leading the aircraft on an upward or downward course.

Excess stability in an aircraft makes it difficult to perform maneuvers during flight, such as changing nose attitude. This characteristic requires very steep deflections of the elevators for the aircraft to respond satisfactorily to this pitch command and, with this, the longitudinal control of this aircraft is impaired.

This situation of impaired longitudinal control can be found in turboprop/propfan aircraft that have the engines mounted on large pylon structures positioned in the rear portion of their fuselage, close to the vertical and horizontal empennage. Such pylon surfaces mounted on the rear of the aircraft increase the stability of the configuration without providing control. Therefore this aircraft configuration presents high stability causing damage to its longitudinal control.

Figure 2:
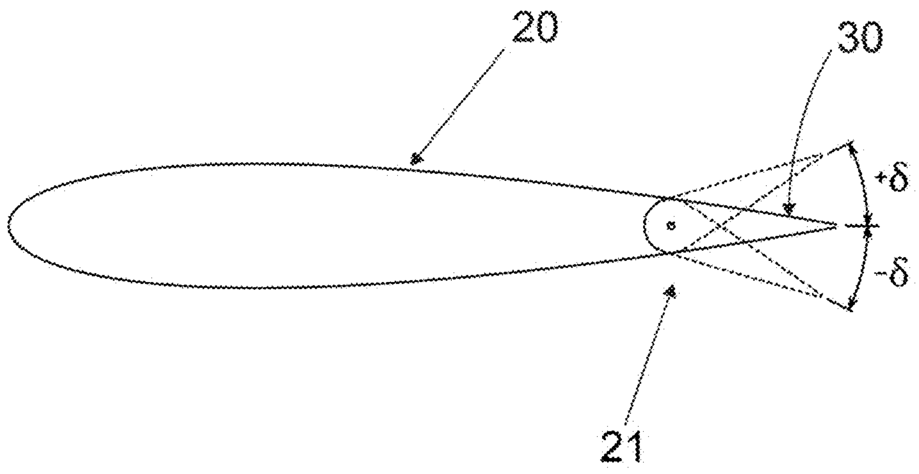
FIG. 2—is a schematic view of the aircraft longitudinal control surface.
Figure 3:
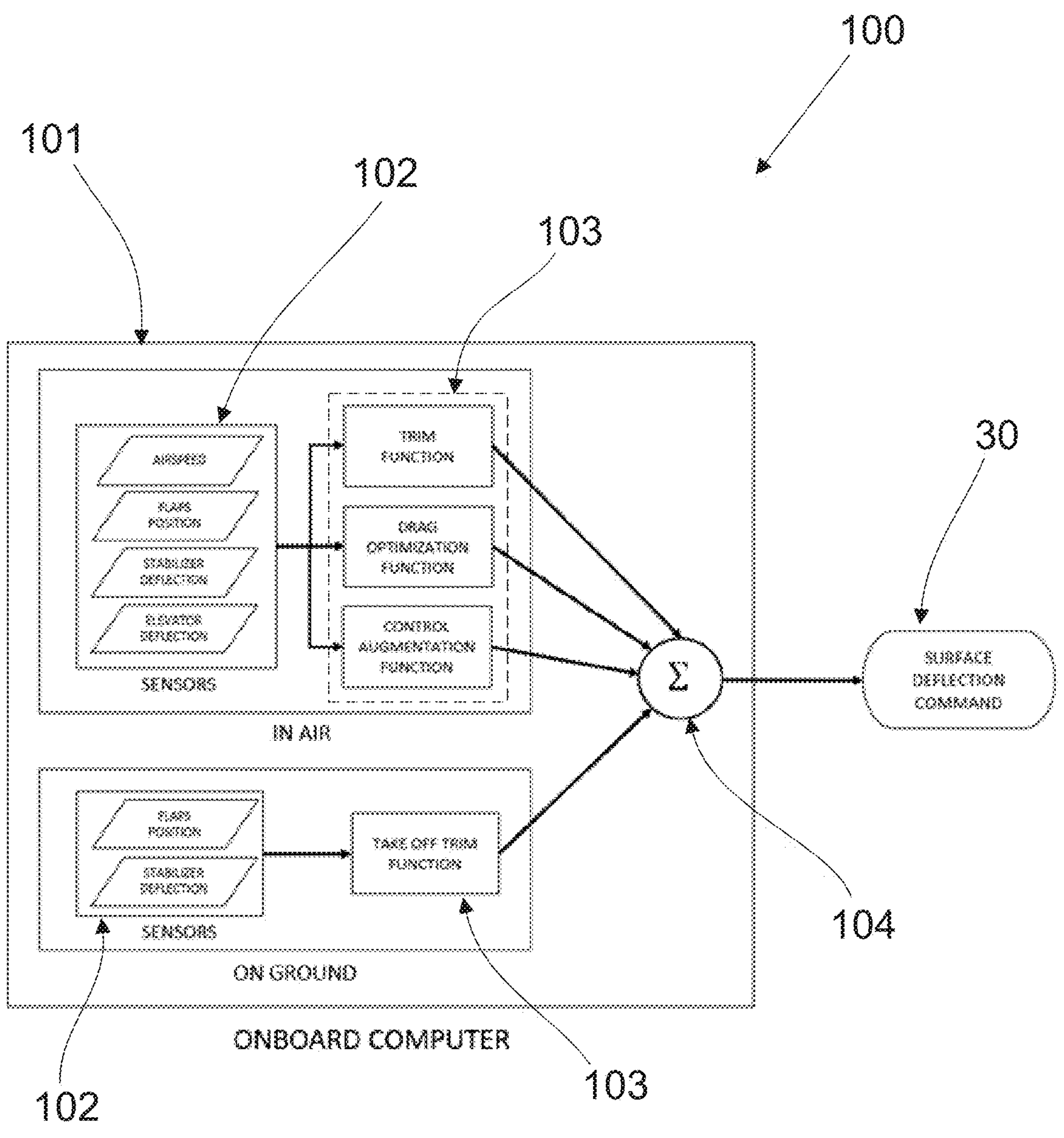
FIG. 3—is a schematic flowchart of the aircraft longitudinal control augmentation system.

Thus, according to a preferred embodiment illustrated in FIGS. 1 to 3, a longitudinal control augmentation surface 30 for aircraft with engines is disposed in a rear portion of the fuselage and to a longitudinal control augmentation system 100 for aircraft with engines disposed in a rear portion of the fuselage, particularly turboprop/propfan aircraft, with the engines 12 arranged in a rear portion of the fuselage 11, next to its vertical empennage 13.

As can be seen in FIG. 1, the aircraft 10 comprises connecting structures of the engines 12 in the fuselage 11, also known as pylons, which position a turboprop/propfan engine 12 on each side of the fuselage 11. Furthermore, this aircraft 10 comprises primary longitudinal control surfaces 40, also known as elevators, and which are connected to the longitudinal stabilizer surfaces 41. Both primary longitudinal control surfaces 40 and longitudinal stabilizing surfaces 41 are movable to perform the longitudinal control of the aircraft.

The connecting structures 20 of the engines 12 in the fuselage 11, arranged one on each side of the fuselage, are provided, each one, with the a longitudinal control surface 30 of the aircraft positioned adjacent to its rear edges 21 at a hinged junction.

This longitudinal control enhancement surface 30, illustrated in detail in FIG. 2, is positioned along the trailing edge 21 of the connecting structure 20 in an articulated joint. In this way, this longitudinal control augmentation surface 30 is pivotable up and down relative to the connecting structure 20, at variable deflection angles (δ) upwards or downwards, in response to the demand sent by the augmentation system. longitudinal control 100 and executed by the control actuators acting on that surface 30.

More specifically, this longitudinal control augmentation system 100, illustrated in FIG. 3, prescribes specific functions for the use of the longitudinal control augmentation surface 30 of aircraft 10 with engines arranged in the rear portion of the fuselage. These functions depend on the flight phase and other parameters such as, for example, the deflection of hyperlift surfaces (flaps), the aircraft speed and the deflection of the primary and longitudinal stabilizer surfaces, and work together to define the deflection of the longitudinal control augmentation surface 30 with the aim of optimizing the aerodynamic and control performance of the aircraft 10.

FIG. 3 shows the aircraft's onboard computer 101 which may include one or more processors connected to one or more non-transitory memory devices storing program instructions. The one or more processors may execute the program instructions to perform operations including control of the aircraft via a fly-by-wire system including hydraulic and/or other electromechanical actuators that position control surfaces of the aircraft. Some embodiments of onboard computer 101 may include a combination of hardware and software such as digital logic circuits that implement such control functions. By means of the aircraft's onboard computer 101, the system 100 inputs a plurality of signals received by the aircraft's onboard computer 101 and from a plurality of sensors 102 into a plurality of functions processing 103 that process these signals, resulting in a plurality of deflection demands for the longitudinal control augmentation surfaces 30 of the aircraft 10. This plurality of deflection demands for the longitudinal control augmentation surfaces 30 are received by a summation function 104 which equalizes them and sends, finally, a single deflection demand to the longitudinal control augmentation surface 30 of the aircraft 10.

Still as can be seen in FIG. 3, the sensors 102 perform the most diverse types of sensing, such as, for example, sensing the air speed, sensing the position of the flaps, sensing the deflection of the stabilizers, sensing the deflection of the elevators, among others. Likewise, function processing 103 consists of trimming function processing, drag optimization function processing, and so on.

The system 100 receives signals from sensors 102 when aircraft 10 is in flight or on the ground, and function processing 103 sends the plurality of deflection demands to summation function 104 which sends the equalized deflection demand to the longitudinal control augmentation surfaces 30 when the aircraft 10 is in flight or on the ground.

Therefore, the longitudinal control augmentation system for 100 aircraft comprises means for controlling the longitudinal control augmentation surfaces which operates in conjunction with the primary longitudinal control surfaces and the longitudinal stabilizing surfaces 41 when the aircraft is in flight or on the ground, in order to distribute the longitudinal offset of the aircraft between these two surfaces, attributing robustness to the longitudinal control of this aircraft and achieving an optimal balance between control and stability in different stages of flight.

This means that, with the longitudinal control augmentation surface 30 acting as secondary control surfaces along with the primary longitudinal control surfaces 40 and the longitudinal stabilizing surfaces 41 on the aircraft 10, the system 100 makes it possible to find an optimal balance at equilibrium that minimizes the drag of the aircraft with compensated moments among other optimizations, as will be detailed in the following functions:

1) Longitudinal Trimming

This function generates deflections of the longitudinal control augmentation surfaces 30 in response to continuous deflections of the longitudinal stabilizing surfaces 41.

The objective is to reduce the command deflections of the longitudinal stabilizer surface 41 necessary to balance the aircraft 10 in straight and level flight, providing greater control capacity available for the execution of maneuvers. This function works at low frequencies and can be limited to specific flight regions.

2) Trimming Drag Optimization

This function generates deflections of the longitudinal control augmentation surface 30 in response to deflections of the longitudinal stabilizer surface 41. The objective is to optimize the aircraft's trim drag by distributing the necessary lift for the longitudinal moment balance of the aircraft 10 between the two control surfaces available (longitudinal stabilizing surface 41 and longitudinal control augmentation surface 30).

The optimization (reduction) of drag is due to the difference in the inclination of the lift vector generated by these surfaces, provided by the different downwash angles (airflow deflection caused by the wing) observed by each surface and the aerodynamic efficiency of each surface. The downwash perceived by the horizontal empennage is effectively less than the downwash perceived by the pylon, generating less inclined lift vectors that bring less drag benefits. Using the longitudinal control augmentation surface 30 to generate a greater contribution of lift to the trim and taking advantage of the greater vector inclination due to the greater downwash, it is possible to achieve a significant reduction in drag. This function works at low frequencies and can be limited to specific flight regions.

3) Increased Longitudinal Control

This function generates deflections of longitudinal control augmentation surface 30 to assist aircraft longitudinal control in maneuvers in response to deflection of primary longitudinal control surface 40. The control generated by longitudinal control augmentation surface 30 is medium frequency and has the objective to ensure the longitudinal control capability of the aircraft in combination with the primary longitudinal control surface 40. This function may have limited authority and may be limited to specific regions of flight.

4) Takeoff Trim

This function generates deflections of the longitudinal control augmentation surface 30 in response to deflections of the longitudinal stabilizing surface 41 of the aircraft 10 during preparation for takeoff.

In preparation for takeoff, the pilot positions the longitudinal stabilizer surface 41 at deflections defined in the flight manual for the condition of the aircraft 10 using a control available in the cockpit and the longitudinal control augmentation surface 30 is deflected by the flight computer to a preset position depending on the deflection of the longitudinal stabilizing surface 41.

Thus, in combination with the primary longitudinal control surfaces 40 and the longitudinal stabilizing surfaces 41, the longitudinal control augmentation surface 30 is capable of generating sufficient forces and moments to balance the aircraft in trimmed flight and also distributing these forces and moments among the surfaces for the best overall lift condition, drag and traction is achieved. It is possible, for example, to generate forces in different directions between the longitudinal control augmentation surfaces 30 and the longitudinal stabilizing surfaces 41, to take advantage of the best aerodynamic performance of each surface under a given flight condition.

Therefore, distributing the trimming moments of the aircraft 10 efficiently between the longitudinal control augmentation surface 30 and the longitudinal stabilizing surfaces 41 for each flight condition, it is possible to achieve active drag reduction over the entire flight envelope increasing the overall efficiency of the aircraft in the mission.

In addition, a further advantage of technology herein lies in optimizing airframe and propulsion integration, in all flight phases and aircraft 10 envelope conditions. In this sense, the consumption of the aircraft will depend on the efficiency of the airframe and the efficiency of the propulsion system, since the efficiency of the propulsive system is affected by the lift generated in the assembly formed by connecting surfaces 20, the longitudinal control augmentation surfaces 30, the primary longitudinal control surfaces 40 and the longitudinal stabilizing surfaces 41. Changing the deflection of the longitudinal control augmentation surface 30 affects the efficiency of the propulsive system, allowing to pursue optimal efficiency in all phases of flight. Such feature is not possible in the traditional arrangement already known from the state of the art, with incidence of the engine and the fixed surfaces in relation to the fuselage.

Having described example embodiments, it should be understood that the scope of protection is not limited to the disclosed embodiments but rather is defined by the claims and includes possible variations and equivalents.

The invention claimed is:

1. An aircraft with engines arranged in a rear portion of a fuselage and further comprising control surfaces including:

a primary longitudinal control surface located in a horizontal tail of the aircraft, and a longitudinal control enhancement surface comprising a secondary control surface that cooperates with and complements the primary control surface located in the horizontal tail for longitudinal control of the aircraft, wherein the longitudinal control enhancement surface is positioned close to a trailing edge of a pylon engine connecting structure in the fuselage on a joint that hinges up and down in relation to the engine connecting structure in response to a longitudinal control command from the aircraft, wherein the joint is hinged up and down with respect to the pylon engine connecting structure in varying deflection angles (δ) commanded by the longitudinal control command, the aircraft further comprising a summer that receives and equalizes a plurality of demands of deflection to the control surfaces of the aircraft and in response, sends a single deflection demand longitudinal control command to control the longitudinal control enhancement surface to hinge the joint to a deflection angle (δ) the longitudinal control command specifies.

2. The aircraft of claim 1 wherein the summer is configured to distribute lift for longitudinal moment balance of the aircraft between the longitudinal control enhancement surface and other control surfaces of the aircraft to actively reduce drag over the flight envelope of the aircraft.

3. The aircraft of claim 1 wherein the primary longitudinal control surface comprises an elevator, and the longitudinal control enhancement surface is positioned at a hinged junction adjacent a rear edge of one of the engine connecting structures comprising a pylon at a side of the fuselage.

4. A longitudinal control augmentation system for an aircraft with engines arranged in a rear portion of a fuselage and provided with primary longitudinal control surfaces, secondary augmentation control surfaces attached to engine connecting structures, and longitudinal stabilizing surfaces, the longitudinal control augmentation system comprising:

an onboard computer receiving a plurality of signals from a plurality of sensors, the onboard computer being configured to perform a plurality of processing functions;

wherein the longitudinal control augmentation system inputs the plurality of signals from the plurality of sensors received by the on-board computer into the plurality of processing functions that issue a plurality of demands of deflection to the control surfaces of the aircraft;

the plurality of demands of deflection to the primary longitudinal control surfaces and the secondary augmentation control surfaces are received by a summation function which equalizes them and sends a single deflection demand to the secondary augmentation control surfaces at least one of which is positioned close to a trailing edge of an engine connecting structure in the fuselage on a joint that can be hinged up and down in relation to the engine connecting structure in response to a longitudinal control command from the aircraft.

5. The longitudinal control augmentation system according to claim 4, wherein the onboard computer controls the secondary augmentation control surfaces in cooperation with the primary longitudinal control surfaces and the longitudinal stabilizing surfaces of the aircraft to distribute longitudinal compensation of the aircraft between the primary longitudinal control surfaces, the secondary augmentation control surfaces and the longitudinal stabilizing surfaces by means of functions.

6. The longitudinal control augmentation system according to claim 4, wherein the onboard computer receives signals from the sensors when the aircraft is in flight or on the ground.

7. The longitudinal control augmentation system according to claim 4, wherein the plurality of processing functions issue a deflection demand to the secondary augmentation control surfaces when the aircraft is in flight or on the ground.

8. The longitudinal control augmentation system according to claim 4, wherein the summation function distributes lift for longitudinal moment balance of the aircraft between the secondary augmentation control surfaces and the other control surfaces of the aircraft to actively reduce drag over the flight envelope of the aircraft.

9. The longitudinal control augmentation system according to claim 8 wherein the summation function optimizes trim drag of the aircraft by distributing the lift for the longitudinal moment balance of the aircraft between the longitudinal stabilizing surfaces and the secondary augmentation control surfaces.

10. The longitudinal control augmentation system according to claim 4 wherein the secondary argumentation control surfaces are positioned at hinged junctions adjacent rear edges of the engine connecting structures comprising pylons at each side of the fuselage.

11. The longitudinal control augmentation system of claim 4 wherein the primary longitudinal control surfaces comprise elevators.

12. A longitudinal control augmentation method for an aircraft with engines arranged in a rear portion of a fuselage and provided with primary longitudinal control surfaces, secondary augmentation control surfaces attached to engine connecting structures, and longitudinal stabilizing surfaces, the method comprising:

receiving a plurality of signals from a plurality of sensors, and performing, with at least one processor or processing circuit, a plurality of automatic processing functions in response to the received plurality of signals, including inputting the plurality of signals from the sensors into the plurality of automatic processing functions and issuing a plurality of demands of deflection to control surfaces of the aircraft;

the plurality of demands of deflection to the primary longitudinal control surfaces and the secondary augmentation control surfaces being received by a summation function which equalizes them and sends a single deflection demand to the secondary augmentation control surfaces at least one of which is positioned close to a trailing edge of an engine connecting structure in the fuselage on a joint that can be hinged up and down in relation to the engine connecting structure in response to a longitudinal control command from the aircraft.

13. The longitudinal control augmentation method according to claim 12, further including controlling the secondary augmentation control surfaces in cooperation with the primary longitudinal control surfaces and the longitudinal stabilizing surfaces of the aircraft to distribute longitudinal compensation of the aircraft between the primary longitudinal control surfaces, the secondary augmentation control surfaces, and the longitudinal stabilizing surfaces by the automatic processing functions.

14. The longitudinal control augmentation method according to claim 13, further including receiving signals from the sensors when the aircraft is in flight or on the ground.

15. The longitudinal control augmentation method according to claim 13, further including the automatic processing functions issuing a deflection demand to the secondary augmentation control surfaces when the aircraft is in flight or on the ground.

16. The longitudinal control augmentation method according to claim 12, wherein the summation function distributes lift for longitudinal moment balance of the aircraft between the secondary augmentation control surfaces and the other control surfaces of the aircraft to actively reduce drag over the flight envelope of the aircraft.

17. The longitudinal control augmentation method according to claim 16 wherein the summation function optimizes trim drag of the aircraft by distributing the lift for the longitudinal moment balance of the aircraft between the longitudinal stabilizing surfaces and the secondary augmentation control surfaces.

18. The longitudinal control augmentation method according to claim 12 wherein the secondary augmentation control surfaces are positioned at hinged junctions adjacent rear edges of the engine connecting structures comprising pylons at each side of the fuselage.

19. The longitudinal control augmentation method of claim 12 wherein the primary longitudinal control surfaces comprise elevators.

* * * * *